(12) United States Patent
Hewett et al.

(10) Patent No.: US 8,744,898 B1
(45) Date of Patent: Jun. 3, 2014

(54) SYSTEMS AND METHODS FOR USER CHURN REPORTING BASED ON ENGAGEMENT METRICS

(75) Inventors: Edward L. Hewett, Crockett, TX (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 388 days.

(21) Appl. No.: 12/945,749

(22) Filed: Nov. 12, 2010

(51) Int. Cl.
*G06Q 10/00* (2012.01)
*G06Q 30/00* (2012.01)

(52) U.S. Cl.
USPC .................................... 705/7.31; 705/7.29

(58) Field of Classification Search
USPC ................................ 705/7.11–7.42
See application file for complete search history.

(56) References Cited

U.S. PATENT DOCUMENTS

| | | | | |
|---|---|---|---|---|
| 7,340,408 | B1* | 3/2008 | Drew et al. | 705/7.33 |
| 7,761,088 | B1* | 7/2010 | Hannan et al. | 455/414.1 |
| 8,442,854 | B2* | 5/2013 | Lawton et al. | 705/7.29 |
| 2003/0229534 | A1* | 12/2003 | Frangione et al. | 705/10 |
| 2004/0039593 | A1* | 2/2004 | Eskandari | 705/1 |
| 2007/0011224 | A1* | 1/2007 | Mena | 709/200 |
| 2007/0156673 | A1* | 7/2007 | Maga et al. | 707/5 |
| 2009/0157449 | A1* | 6/2009 | Itani et al. | 705/7 |
| 2009/0190729 | A1* | 7/2009 | Chakraborty et al. | 379/112.01 |
| 2009/0292583 | A1* | 11/2009 | Eilam et al. | 705/10 |
| 2011/0004549 | A1* | 1/2011 | Gray et al. | 705/40 |
| 2011/0209067 | A1* | 8/2011 | Bogess et al. | 715/736 |
| 2011/0218955 | A1* | 9/2011 | Tang et al. | 706/52 |
| 2011/0269421 | A1* | 11/2011 | Moore et al. | 455/406 |
| 2011/0295649 | A1* | 12/2011 | Fine et al. | 705/7.29 |

OTHER PUBLICATIONS

Web Analytics Association, "Web Analytics Definitions," Approved Aug. 16, 2007, pp. 1-34.
Gary Angel, et al., "Functionalism: A New Approach to Web Analytics," Semphonic 2006, Jul. 2006, pp. 1-29.

* cited by examiner

*Primary Examiner* — Sujay Koneru
(74) *Attorney, Agent, or Firm* — Kilpatrick Townsend & Stockton LLP (57) ABSTRACT

Methods and systems for user churn reporting based on engagement metrics are disclosed. In some embodiments, methods and systems may provide mechanisms for reporting the number of users or customers that are disengaged from a service or product. These embodiments may be employed, for instance, in cases where there is no "analytic footprint" marking discontinuation of service—e.g., where there is no explicit "subscription cancellation request," "subscription expiration," "opt-out," or the like in connection with a user's disengagement. Other embodiments are applicable to subscription-based models, for example, where users have not "unsubscribed" from the service but should nonetheless no longer be considered engaged. As such, systems and methods disclosed herein may enable assessment and improvement of marketing campaign and retention efforts based on their effectiveness in reducing the number of churned users, re-engagement of users that have abandoned a particular product or service, etc.

19 Claims, 8 Drawing Sheets

SYSTEMS AND METHODS FOR USER CHURN REPORTING BASED ON ENGAGEMENT METRICS

BACKGROUND

1. Field of the Invention

This specification relates to data processing, and, more particularly, to systems and methods for user churn reporting based on engagement metrics.

2. Description of the Related Art

The concept of "churn rate" has traditionally been used by businesses that provide subscription-based services (e.g., cable television, mobile phone, printed media, etc.). Specifically, the term "churn rate" usually refers to a measure of the number of subscribers that have abandoned a service over a specific period of time. This measure may be useful, for instance, to determine the steady-state level of customers that a subscription-based business is capable of supporting.

In some instances, the churn rate may serve as an indicator of customer dissatisfaction, competition, and/or the service's natural life cycle. As a practical matter, marketing professionals wish to reduce the number of acquired users who may later abandon a promoted product or service. Incidentally, in cases where the product or service is offered as a subscription, a user's abandonment of the service often leaves a clear analytical footprint—e.g., a subscription cancellation request or expiration date.

In these scenarios, churn rate reporting becomes a relatively straight-forward task. For example, a business may determine how many subscribers it has and how many cancellation requests it has received. For sake of illustration, assume that the business has 50 subscribers and that it has received 5 cancellation notices. A simple churn rate metric may thus be calculated as the number of subscription cancellations divided by the number of subscribers—i.e., 10%.

SUMMARY

This disclosure is related to systems and methods for user churn reporting based on engagement metrics.

In some embodiments, systems and methods disclosed herein provide mechanisms for reporting the number of users or customers that are "disengaged" from a service or product. These systems and methods may be employed, for example, in situations where there is no "analytic footprint" marking the discontinuation of the service or product—e.g., where there is no "subscription cancellation request," "subscription expiration," "opt-out," or the like. In other embodiments, systems and methods disclosed herein find applicability in connection with subscription-based business models where, for example, users may not have "unsubscribed" from a service but may nonetheless no longer be considered "engaged" with a service or product according to some specified engagement metric.

As such, systems and methods disclosed herein may enable the assessment and improvement of marketing campaigns and other user retention efforts. For example, certain systems and methods may determine which efforts are most effective in reducing the number of churned users. Other systems and methods may be used for re-engaging users that have previously abandoned (or that are likely to eventually abandon) a particular product or service. Additionally or alternatively, certain systems and methods disclosed herein may be used to measure and/or increase a "level of engagement" of groups of users.

In some embodiments, by comparing the total number of acquired users with the number of users still engaged with the product or service during a given time period according to one or more engagement metrics, a variety of user churn calculations may be performed. These calculations may include, for example, a lifetime total and percent disengaged or "churned" users, a change in churned users from one time period to another, a number and percentage of churned users in a given segment, a user lifespan (e.g., to create average lifespan for lifetime value calculations), and/or a number and percentage of churned users trended over time.

In order to gather data that facilitates some of these calculations, certain embodiments may take measurements at predetermined stages of user interaction with the product or service at issue. For example, in the case of a software product (e.g., a mobile phone application), the software may collect information concerning its execution by the user (e.g., the application is launched or a specified feature within the application is selected). In addition, a user or customer identifier may accompany each interaction, for instance, to differentiate newly acquired users from previously acquired users (e.g., device ID, authenticated ID, cookie ID, loyalty or member ID, etc.). This "event data" may be provided, for example, to a metrics server over a network. The server may then utilize the event data to calculate one or more of the user churn metrics disclosed herein.

In some embodiments, behavior that defines "engagement" for purposes of a product or service may be specified by a third party (e.g., a product developer, a marketing professional, etc.). In the case of a software product, for example, a software routine that gathers engagement actions and user identification may be embedded into the software product itself. Alternatively, the mechanism that detects such event data may be separate from the actual product or service. In either case, the specified behaviors may be allowed to change over time so engagement actions may be redefined during the life of the product or service.

In certain embodiments, a specified engagement action may be customized for a particular type of user, geographic location, etc. Also, in addition to reporting engagement actions associated with the product or service of interest, systems and methods described herein may report actions associated with other products (e.g., for comparison purposes, etc.).

In some embodiments, once in possession of event data obtained from one or more users, systems and methods described herein may provide user churn reports or the like. These churn reports may be made available, for example, through an analytics tool via a web interface and/or standalone client software. These reports may, in some instances, be segment-based (e.g., by campaign, by install date, by device, by distribution channel, etc.). To that end, data on two or more dimensions may be collected at the initial engagement and/or at subsequent times. In some embodiments, the analytics tool may allow a client to slice data and generate churn reports in a customized manner.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, the term "churned user" refers to a user who fails to complete one or more actions or desired engagement behaviors during a specified time period. Examples of an action or desired engagement behavior include, but are not limited to, a product purchase, a download, a website visit, a software execution, a software upgrade, etc. In some embodiments, the type and/or level of "engagement" that may be used to determine whether a user or customer is an "engaged user" may be defined by a third party such as, for example, a product developer, a product manager, a marketing professional, an executive, or the like. Moreover, the type and/or level of "disengagement" that may be used to determine whether the user or customer is a "churned user" may be defined by implication.

Systems and methods disclosed herein may provide mechanisms for determining and/or reporting a number of users or customers that are disengaged from a service or product. These embodiments may be employed, for instance, in cases where there is no "analytic footprint" marking discontinuation of service. For example, when the service or product of interest is other than a subscriber-based service or product, there may not be an explicit or express "subscription cancellation request," "subscription expiration," "opt-out," or the like in connection with a user's disengagement. Furthermore, even in a subscription environment, certain users may not be considered engaged (or fully engaged) despite maintaining their subscription. For instance, a user may not have cancelled a subscription service, but may no longer be purchasing an expected or desired number of products under the current subscription. Accordingly, in some embodiments, systems and methods described herein may detect and report a "level of engagement" associated with one or more users. For example, a level of engagement may indicate a value between complete disengagement and a desired or adequate level of engagement.

As such, systems and methods disclosed herein may enable the assessment and improvement of marketing campaign and other user retention efforts, for example, by determining which efforts are most effective in reducing the number of churned users. Other systems and methods may be used for re-engaging users that have previously abandoned (or that are likely to eventually abandon) a particular product or service, whether or not the product or service is offered under a subscription. Additionally or alternatively, certain systems and methods disclosed herein may be used to measure and/or increase a "level of engagement" of groups of users.

In some embodiments, by comparing a total number of users with the number of users engaged with the product or service during a given time period according to one or more engagement behaviors, a variety of user churn metrics may be calculated. These calculations are explained in more detail below.

Figure 1:
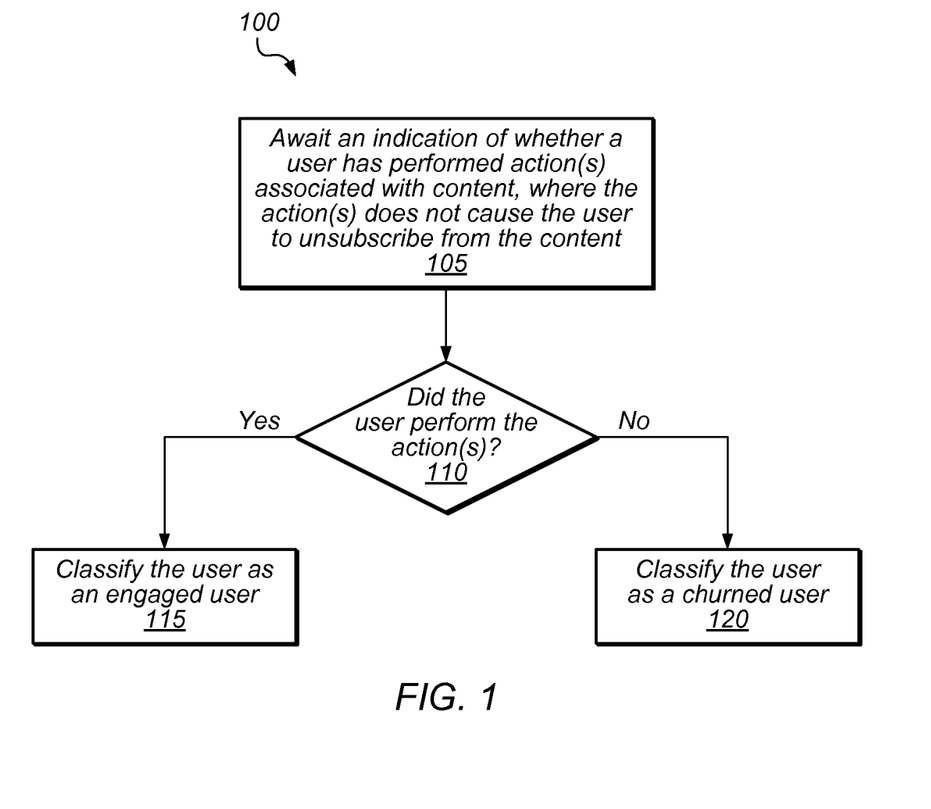
FIG. 1 is a flowchart of a method for classifying an individual user or customer according to some embodiments.

FIG. 1 is a flowchart of a method for classifying an individual user or customer according to some embodiments. As illustrated at 105, method 100 may await and/or receive event data indicating whether the individual user has performed a pre-determined action(s) associated with a product and/or service. The product or service may be any form of content such as, for example, electronic content. In some cases, the electronic content may be provided as a service and/or as one or more websites or web pages that may be visited or otherwise accessible by the user via the Internet. In other cases, the electronic content may be a software application executable by the user—e.g., desktop software, mobile phone application, console games, etc. In yet other cases, the electronic content may include media (e.g., movies, pay-per-view broadcasts, etc.) provided through a cable or satellite service provider, etc.

In some embodiments, the "content" may be non-electronic. For example, the content may be a physical product available to customers (i.e., "users") at a retailer. Customers may be uniquely identified by a customer number or customer loyalty program ID number. Additionally or alternatively, the content may be any kind of service available to customers through a service provider.

At 110, method 100 determines whether the user performed the actions specified for or associated with the content. In some embodiments, this determination may be made upon receipt of information or notification containing event data indicating that the user has in fact performed the predetermined actions. For example, when the content is a website, actions may be detected by a web server receiving an HTTP requests from the user. If the content is a software application, for instance, an action may be the launching or execution of the application by the user.

In some cases, one or more software routines that define and/or detect whether the user has performed the predetermined action(s) may be part of the content itself (e.g., plug-in code embedded within a software product). These software routines may be written in a programming language such as Java, JavaScript, C, C++, Objective-C, PHP, Visual Basic, Perl, Python, or any other suitable programming language. In other cases, however, software routines that define and/or detect whether the user has performed the predetermined actions may be distinct from the content. For example, a server's detection of a user's HTTP request may be distinct from the webpage itself—i.e., content provided in response to the request.

As noted above, in some embodiments the content may exclude subscriber-based content, and therefore the action(s) does not cause the user to unsubscribe from the content. Moreover, even when the content is associated with a subscription, the action(s) may nonetheless be unrelated to the status of the underlying subscription. For example, in some cases the action may be a specific purchase or a volume of purchases of content provided under a subscription (e.g., how many on-demand movies have been purchased by the user under her cable or satellite TV subscription). Therefore, even in cases where there is an actual subscription, predetermined actions used to distinguish engagement from disengagement (or levels of engagement) may be other than a "subscription cancellation request," "subscription expiration," "opt-out," or the like. Similarly, in the case of software applications, the action(s) may not cause the application to be uninstalled or deleted from a user's device.

If the user has performed the predetermined action(s), then at 115 the user is classified as an "engaged user." Otherwise, at 120 the user is classified as a "churned user." In some embodiments, these classifications may vary according to how the user's behavior changes over time. Hence, operations 105-120 may each correspond to a particular time period. For example, during a first time period the user may not perform the predetermined action(s) and may thus be considered a churned user. In a subsequent period, however, the user may then perform the action(s), and therefore be classified as an engaged or "reengaged" user for that time period. As further discussed below, in some embodiments a periodic classification or reclassification of users as engaged or churned may allow systems and methods described herein to produce user churn reports that correlate user churn metrics with extraneous events (e.g., release of an updated version of the content, start of a marketing campaign, etc.).

In addition to the embodiment illustrated in FIG. 1, other embodiments may classify the user according to its level of engagement. For example, consider a scenario where the "content" is an e-commerce site, and where the pre-defined action is a product purchase. Also assume that, with respect to a certain time period, it is desired to classify the user into one of an arbitrary number of levels—e.g., disengaged (no purchases), low engagement (1-2 purchases), moderate engagement (3-5 purchases), and high engagement (6-10 purchases). In some embodiments, at the end of the period (or upon request), the e-commerce server hosting the website may report the number of purchases made by that user. A determination may then be made as to the user's level of engagement based on that information. In the case of software applications, similar procedures may be implemented, for example, with respect to the number of times within a specified time period that the application is launched, the length of time that the application remains under execution each time it is executed, and/or the number of times a particular feature or number of features are selected during execution.

As noted above, actions that trigger various "levels of engagement" may be specified by a product developer, content provider, or the like. Moreover, the defined behavior may be modified over time so engagement events may be updated during the lifetime of the product or service. Also, these actions may be customized for a particular type of user, a user's geographic location, a time of the year, etc.

For example, if a determination is made that the user is a novice user, then the level of engagement expected from this type of user may be lower than that expected from an expert user. Accordingly, the threshold for considering the novice user to be disengaged may be lower (e.g., 1 visit/month) than that for the expert user (e.g., 10 visits/month) or vice-versa. As another example, a mobile software application aimed at a particular geographic location (or type of location) may not be particularly useful when the user is away from that location (e.g., user is away from the beach, etc.). In this case, a user who is demonstrably away from the location of interest may have a threshold for engagement that is lower than users that are at that location. As yet another example, a software application may be particularly designed or otherwise more suitable for use during certain times of the year (e.g., Halloween, etc.), and therefore the engagement threshold around that time may be higher than during other parts of the year. Additionally or alternatively, when a user is in a situation (e.g., geographic location, time of year, etc.) where he or she is not expected to be engaged with the content, data about that particular user may not be taken into account for purposes of user churn metric calculations.

In some embodiments, in addition to reporting event data associated with the product or service of interest, systems and methods described herein may also report user actions associated with other products (e.g., to compare usage among different products, etc.). For example, in the case of software applications, a client-side application may determine how many times two or more applications have been executed, or the like.

To enable certain user churn metric calculations described herein, an identifier unique to the user may accompany set of event data. In some cases, this may allow differentiation between newly acquired users and previously acquired users. Examples of user identifiers include device ID, authenticated ID, Media Access Control address (MAC address), IP address, e-mail address, etc. In some embodiments, a unique user identifier may be better suited for "lifetime" measurements because they are less likely to change over time. In other embodiments, however, a non-unique identifier may be used such as, for example, a cookie ID. Furthermore, other information such as Global Positioning Satellite (GPS) coordinates, etc. may be gathered and conveyed. Some or all of this information may be provided, for example, in the form of event data to a metrics server over a network shown in FIG. 7. The server may then utilize the event data to calculate at least some of the user churn metrics disclosed herein.

In embodiments where the content is not electronic (e.g., products sold at brick-and-mortar stores), a customer identifier may be provided in the form of a loyalty card, membership card, credit card, or the like. For example, a customer may provide his or her card to a cashier upon completion of a transaction (e.g., purchase) of a product (or service). The cashier may scan or otherwise identify a user ID contained in the card, and associate the transaction with the card owner. The customer identifier as well as some or all of the purchase or engagement information may then be collected in the form of event data. Other information accompanying or otherwise included in the event data may include the store's identifier, physical address, or the like. In cases where a business is interested in consolidating customer or user activities across its online and brick-and-mortar outlets, event data originating from both environments may be combined to provide user churn metrics. For example, online user ID and card membership ID may be correlated for the same users or customers, for instance, using an indexed table or the like.

Figure 2:
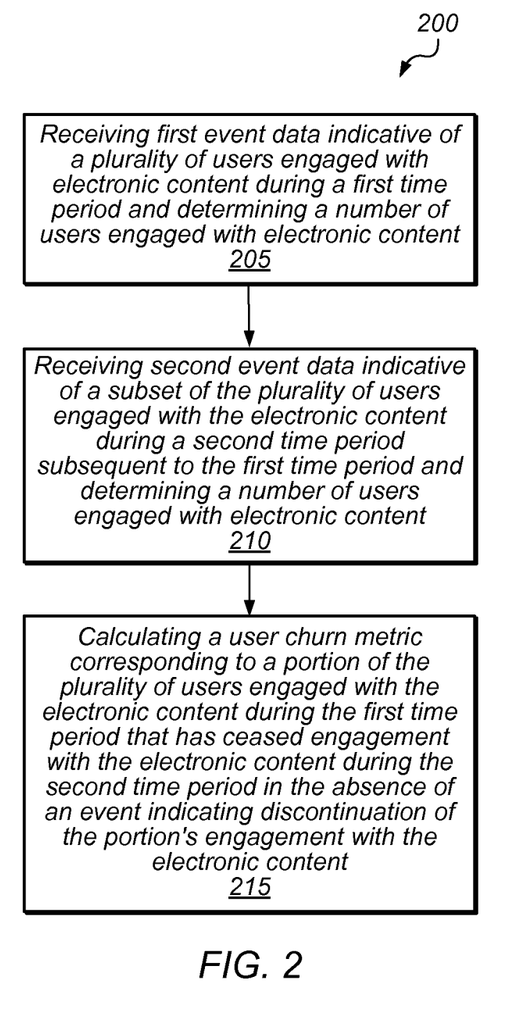
FIG. 2 is a flowchart of a method for calculating a user churn metric according to some embodiments.

Referring now to FIG. 2, a flowchart of a method for calculating user churn metrics is depicted according to some embodiments. As illustrated, at 205 method 200 may receive first event data indicating and/or identifying users that were engaged with a particular electronic content during a first time period. This event data may be received, for example, in response to users performing specified action(s) associated with the content, and may generally indicate that those users should be considered engaged users for the first time period. Still at 205, a determination may be made, based at least in part on the first event data, of the number of users engaged with the content during the first time period. At 210, after a second time period subsequent to the first time period, method 200 receives second event data indicating that a subset of the users was engaged with the electronic content during the second time period. Still at 210, a determination may be made, based at least in part on the second event data, of the number of users engaged with the content during the second time period. Then, at 215, method 200 calculates a user churn metric corresponding to a portion of the plurality of users that was engaged with the content during the first time period but that ceased engagement with the content during the second time period. In some embodiments, these calculations may be performed in the absence of an event indicating discontinuation of engagement with the content. Additionally or alternatively, calculations may be performed in the absence of a subscription discontinuation indication (e.g., cancellation request, expiration, etc.).

In some embodiments, method 200 may identify a number of total users and then calculate a user churn metric based, at least in part, on the number of total users and a number of engaged users for a given time period. In some situations, the number of "total users" may correspond to a particular time period encompassing the entire life of the content. In other situations, the number of "total users" may include a number of users newly acquired during the particular time period. In yet other situations, the number of "total users" may exclude newly acquired users.

In some embodiments, method 200 may calculate a user churn metric as at least one of: a lifetime metric of churned users, a change in churned users from one time period to another time period, a metric of churned users in a segment (e.g., device type, operating system, etc.), etc. Moreover, method 200 may additionally generate a report of user churn. These and other features are described in more detail in connection with the example user churn reports detailed below.

As a first example, consider the following scenario. During month 1, marketing campaign A drives 500 users to make initial visit to promoted content or property (e.g., physical location, mobile application, website, etc.). During month 2, 100 of the initial visitors revisit the property and perform a behavior defined as engagement (e.g., purchase, visit during time period, application upgrade, etc.). Then, during month 3, 50 of the initial visitors revisit the property and perform the engagement behavior. For each of these three time periods, method 200 of FIG. 2 may yield the following user churn reports:

| Month 1 | |
|---|---|
| Engaged users: | 500 |
| Month over month churned users: | 0 |
| Lifetime churned users: | 0 (0% churn) |
| User lifespan: | 0% (after 1 month) |

| Month 2 | |
|---|---|
| Engaged users: | 100 |
| Month over month churned users: | 400 (80% churn) |
| Lifetime churned users: | 400 (80% churn) |
| User lifespan: | 80% (after 2 months) |

| Month 3 | |
|---|---|
| Engaged users: | 50 |
| Month over month churned users: | 50 (50% churn) |
| Lifetime churned users: | 450 (90% churn) |
| User lifespan: | 90% (after 3 months) |

In this first example, it may be noted that the greatest loss in users visiting service from campaign A appears to occur between months 1 and 2. Accordingly, one conclusion may be that the business should focus on keeping users engaged during this particular time period.

In some embodiments, user churn may be represented as a dimension (e.g., lifespan) and/or as a metric (e.g., number of churned users). Moreover, in cases where user churn is represented as a dimension, other metrics may be applied (e.g., revenue) to gauge value of the various user churn rates or the like. In the following table, user churn is represented separately as lifespan.

| User Lifespan | Number of users | Percent of users |
| --- | --- | --- |
| 3 months | 50 | 10% |
| 2 months | 50 | 10% |
| 1 month | 400 | 80% |

And in the following table, lifespan is correlated with revenues.

| User Lifespan | Revenue | Percent of revenue |
| --- | --- | --- |
| 3 months | $600 | 30% |
| 2 months | $400 | 20% |
| 1 month | $1,000 | 50% |

As another example, consider the following scenario. A software application is created and made available through various channels. During month 1, 100 users install and launch the application. During month 2, 50 of the month 1 installers re-launch the application and 25 new users install and launch the application. During month 3, 25 of the month 1 installers re-launch the application, 20 of the month 2 installers re-launch the application, and 25 new users install and launch the application. Accordingly, for each of these time periods, method 200 of FIG. 2 may yield the following user churn reports:

| Month 1 | |
| --- | --- |
| Lifetime users: | 100 |
| Engaged users: | 100 (100 new users) |
| Month over month churned users: | 0 |
| Lifetime churned users: | 0 |
| Lifetime % churn (including new users): | 0% |
| Lifetime % churn (excluding new users): | 0% |
| User lifespan: | 0% (after 1 month) |

| Month 2 | |
| --- | --- |
| Lifetime users: | 125 |
| Engaged users: | 75 |
| | (25 new users; 50 from month 1) |
| Month over month churned users: | 50 (50% churn) |
| Lifetime churned users: | 50 |
| Lifetime % churn (including new users): | 40% |
| Lifetime % churn (excluding new users): | 50% |
| User lifespan: | 50% (after 2 months) |

| Month 3 | |
| --- | --- |
| Lifetime users: | 150 |
| Engaged users: | 70 |
| | (25 new; 25 from month 1; 20 from month 2) |
| Month over month churned users: | 30 (40% churn) |
| Lifetime churned users: | 80 |
| Lifetime % churn (including new users): | 53% |
| Lifetime % churn (excluding new users): | 64% |
| User lifespan: | 75% (after 3 months) |
| User lifespan: | 20% (last 2 months) |

From this set of reports, it may be noted that efforts to reduce user churn appear to be paying off as indicated by the reduced percent churn when comparing months 2 and 3 for users with a lifespan of 2 months (i.e., 50% and 20%, respectively). Similarly as described above for the previous example, when user churn is represented as a dimension, other metrics may be applied to gauge value of the various user churn rates.

As noted in the example scenarios described above, a variety of user churn metrics may be calculated using the systems and methods described herein. Example metrics include a number of lifetime users, a number or percentage of engaged users, a number of churned users (churned users=lifetime users−engaged users), and/or a percentage of churned users (% churned users=(lifetime users−engaged users)/lifetime users). For instance, if a number of lifetime users is 1000 and a number of currently engaged or active users is 150, then the calculated number of lifetime churned users is 850 and the calculated lifetime percent churn is 85%.

Other metrics may include a percentage of churned users excluding new users (% churned users excluding new users=(lifetime users−engaged users−new users)/(lifetime users−new users)) and a "period over period" number of churned users, among others. For instance, if a number of prior total engaged users is 125, a number of current total engaged users is 150, and a number of current engaged users is 50, then the calculated number of current churned users may be 25 and the calculated current percentage of churned users (excluding new users) may be 20%.

In addition to the foregoing, in some embodiments systems and methods may provide segment-based reports. For example, segment-based reports may be generated to show churn by campaign, by install date, by device, etc. To that end, data on two or more dimensions may be collected at the initial engagement (e.g., campaign, install date, service version, device type, etc.) and/or at subsequent times. For example, a report showing the percentage of churned users in a given device OS segment is shown below:

| Device OS Segment | % churn |
| --- | --- |
| iPhone ™ | 80% |
| Blackberry ™ | 35% |
| Android ™ | 55% |
| Windows Mobile ™ | 65% |
| Other | 70% |

This type of reporting may be useful for various purposes such as, for instance, to reveal how popular or successful an application or website is on different platforms, to determine the effectiveness of a marketing campaign over those different platforms, etc. Similarly, a segment-based report showing the percentage of churned users in given marketing campaign segment follows below:

| Campaign Segment | % churn |
| --- | --- |
| Campaign A | 15% |
| Campaign B | 35% |
| Campaign C | 25% |
| Campaign D | 55% |

The segment-based report shown above may be useful, for example, to determine the effectiveness of each different marketing campaign. The systems and methods described herein may also enable churn dimensions such as, for instance, user lifespan, number of days since initial engagement, and/or date of initial engagement, among others. For example, a segment-based report regarding user lifespan may be as follows:

| Days since first engagement | % churn |
|---|---|
| 1 to 15 days | 10% |
| 15 to 30 days | 50% |
| 30 to 60 days | 85% |
| 61+ days | 95% |

This particular segment-based report may be used, for example, to create an average lifespan for lifetime value calculations or the like.

In some embodiments, user churn reports such as the ones illustrated above may be provided via an analytics tool available to a content developer or provider. In some cases, the analytics tool may be in the form of a web-based interface accessible by the content developer over the Internet. In other cases, the analytics tool may be a remote client software licensed or operated by the content developer. Through interaction with the analytics tool interface, the content developer may manipulate the available event data to dynamically produce different types of reports. For example, the content developer may designate different user churn metrics for display. The content developer may also request reports for different market segments, etc. In addition, the content developer may use the analytics tool to filter event data and/or re-define engagement levels or thresholds (e.g., by type of user, geographical location, etc.).

In other embodiments, user churn reports may be provided to the content developer via a spreadsheet dashboard, e-mail, or the like. In addition, user churn reports may be provided in the form of text, tables and/or graphs.

Figure 3:
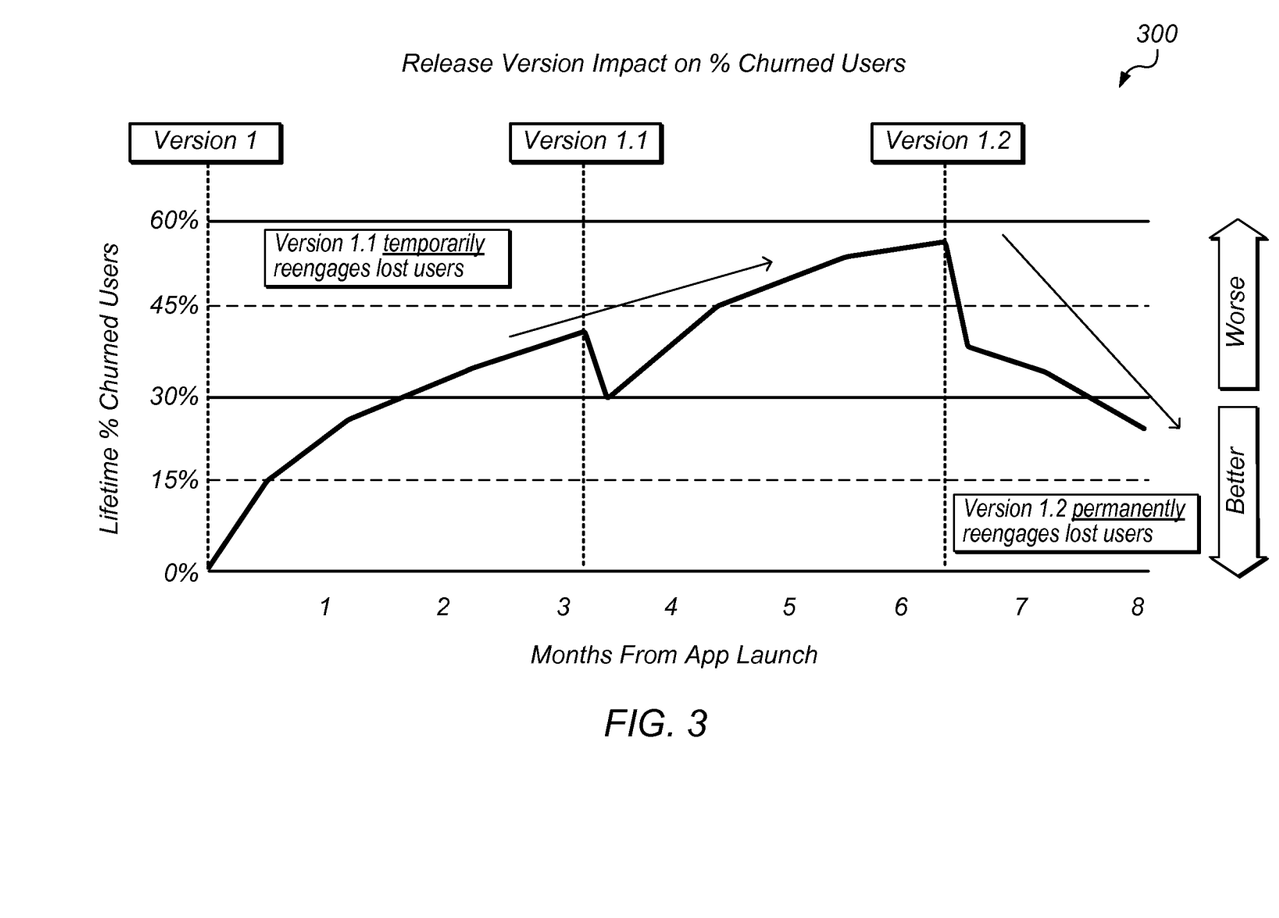
FIG. 3 is a user churn report in graphical form according to some embodiments.

FIG. 3 shows an example of a user churn report in graphical form. Specifically, graph 300 shows the lifetime percentage of churned users versus the number of months from the launch of the content (e.g., a software application). In this graph, an upward trend is typically indicative of a "bad" result (i.e., an increasing number of disengaged users) whereas a downward trend indicates "good" results (i.e., a reduction in the number of disengaged users). In this particular example, graph 300 overlays an indication across the time axis that shows the release of new versions of the content. From the graph, it is apparent that version 1.1 of the application was released immediately after the third month from its original release date (version 1.0), and that version 1.2 was released after the sixth month of the original release date.

Moreover, it is also apparent that the percentage of disengaged users increased steadily after the application's original release, and that upon release of version 1.1 a certain amount of churned users became re-engaged with the content. Shortly thereafter, however, the percentage of churned users continued to increase (as indicated by the downward curve) until the release of version 1.2. At that point, the latest version appears to have permanently reengaged churned users. Hence, graph 300 is capable of illustrating the impact of release versions of the content on user churn. Additionally or alternatively, graph 300 may also overlay indications of marketing campaigns (or other events) across the time axis. These types of reporting may be useful, for example, to provide insight into the relative success of various content marketing or development efforts, etc.

Figure 4:
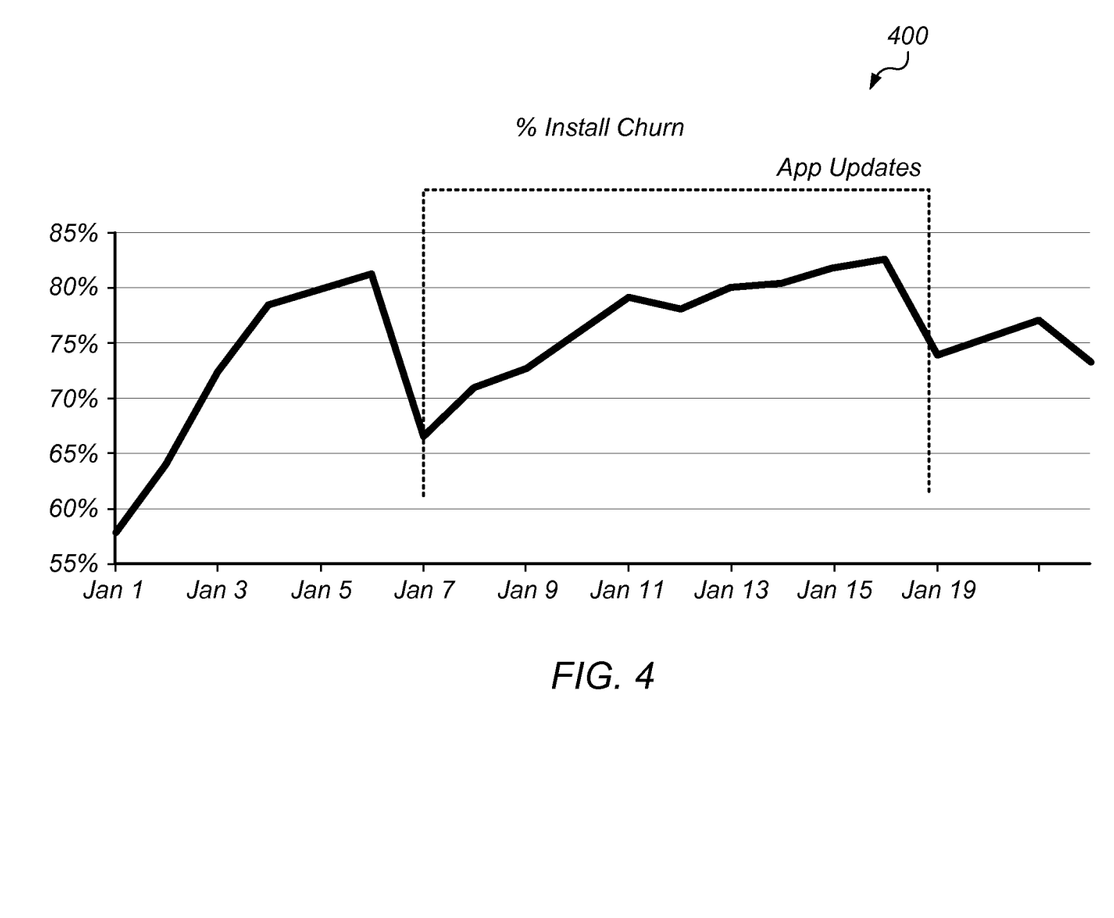
FIG. 4 is another user churn report in graphical form according to some embodiments.

FIG. 4 is a graph of another user churn report according to some embodiments. In this illustration, graph 400 shows the percentage of install churn as a function of time. Graph 400 also shows a window that indicates a period of time during which content updates were released. It may be noted that at the beginning and end of the update window, the percentage of install churn decreased significantly.

Figure 5:
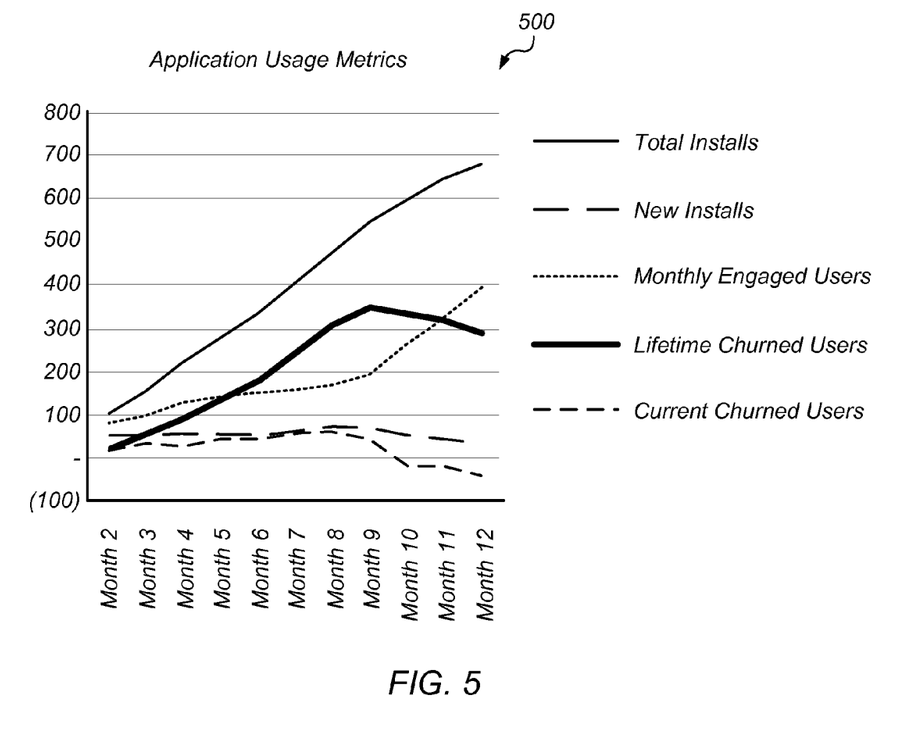
FIG. 5 is a graph of an application usage metrics report according to some embodiments.

FIG. 5 is a graph of an application usage metrics report according to some embodiments. As illustrated, graph 500 shows the absolute number of total installs, new installs, monthly engaged users, lifetime churned users, and current churned users over a period of 12 months. It this example, it may be noted that the monthly user metric shows a positive trend for the entire period. Even though a large portion of users continue to abandon service, this negative trend is hidden by continued user acquisition efforts as evident by the steady number of new users installing the application. It may also be noted that, during month 9, the business starts working to retain users and this positively impacts monthly engaged users.

Figure 6:
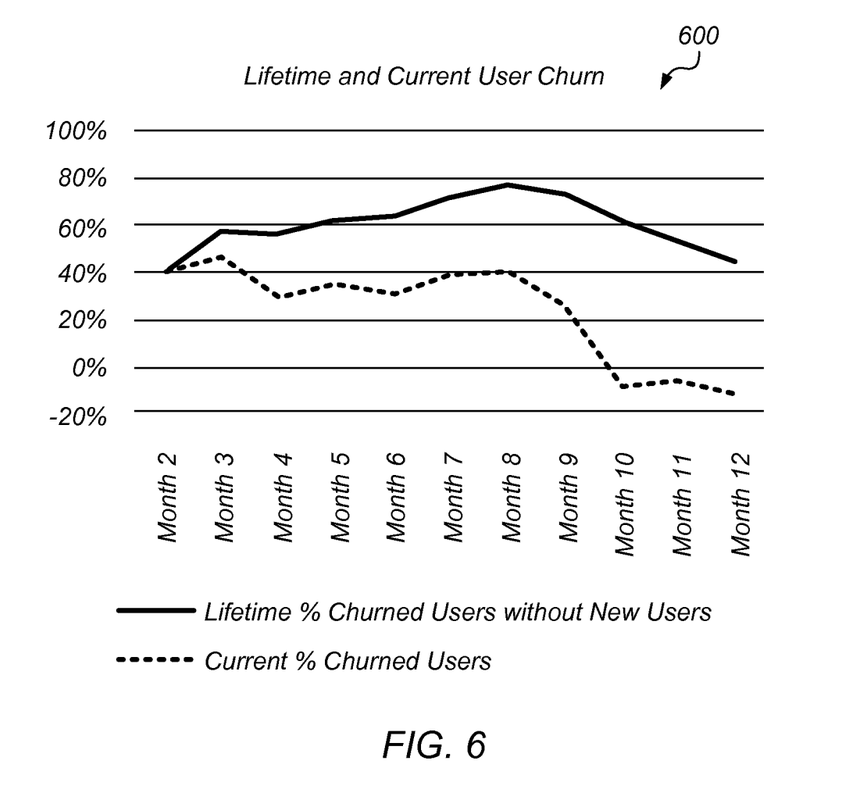
FIG. 6 is a graph of a lifetime and current user churn report according to some embodiments.

FIG. 6 is a graph of a lifetime and current user churn report according to some embodiments. As illustrated, graph 600 shows the percentage of lifetime churned users without new users and also the percentage of current churned users for the same example depicted in FIG. 5 and over the same 12-month period. From graph 600, it appears that efforts to reengage churned users initiated during month 9 are most evident on the current % churn metric, which indicates early improvements in churn rates much quicker than the lifetime churn metric.

Figure 7:
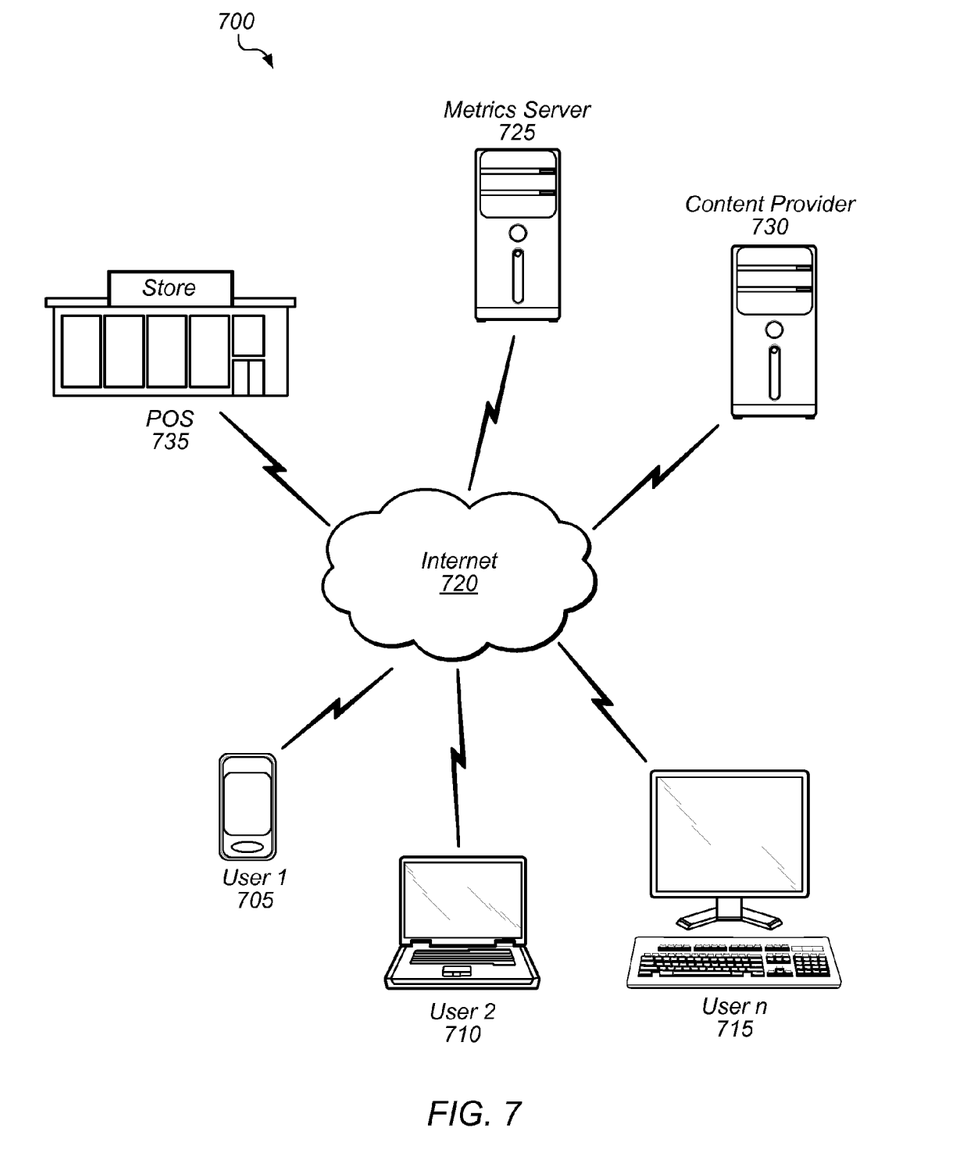
FIG. 7 is a block diagram of a system according to some embodiments.

Referring now to FIG. 7, a block diagram of a system according to some embodiments is depicted. As illustrated, a number of n users 705-715 may obtain content from content provider or server 730 via Internet 720 or some other communications network (e.g., mobile, satellite, CATV, etc.) Each user may operate a different type of device such as, for example, a desktop computer, a laptop computer, a tablet, a PDA, a mobile phone, a cable box, a television, etc. Metrics server 725 may also be connected to Internet 720, and may be configured to perform some of the methods disclosed herein.

In certain embodiments, content provider or server 730 may provide content (e.g., a website or web page) to users 705-715. Particularly, each of users 705-715 may issue an HTTP, HTTPS, FTP request, etc. to content provider 730 in order to view or receive content. In response to the request, content provider 730 may transmit HTML code, a digital object, or the like to the requesting user. In the case of HTML code, for example, the content is typically received and rendered by the user's device. Upon receipt of the user's request, content server 730 may also generate event data indicating that the particular requesting user has made the content request.

Event data may be provided to metrics server 725 in the form of an electronic message, notification, etc. transmitted via the Internet 720. In some embodiments, content provider 730 may transmit the event data to metrics server 725 immediately after the user's action and/or at specified periods of time. In other embodiments, content provider 730 may store the event data and provide it to metrics server's 725 upon its request. In some embodiments, the content may include a web bug, web beacon, tracking bug, tracking pixel, pixel tag, or the like. The web bug may cause the client's device to make a request to metrics server 725, and metrics server 725 may use that particular request to generate event data. The user action may then be recorded along with other information such as, for example, identifying information regarding the user and/or the user's device (e.g., device ID, authentication ID, etc.), GPS location or coordinates, etc.

In certain embodiments, content provider 730 may provide a software application to one or more users 705-715. Accordingly, the application may be installed and/or executed in a user device. In some case, the software may contain one or more routines configured to send event data to metrics server 725 via the Internet 720 when the application is executed. Similarly as above, event data may also be transmitted periodically or upon request, and it may comprise identifying information regarding the user, the user's device, the user's location, etc. In some embodiments, a specified action or behavior condition may include, for example, a purchase made through the application. In other embodiments, a specified action may include, for instance, selection or activation of a particular feature within the application. As previously noted, the type and/or level of "engagement" that is used to determine whether a user or customer is an "engaged user" as well as the corresponding action(s) that evidence such engagement may be defined in any suitable manner.

Although illustrated as distinct entities, in some embodiments metrics server 725 and content provider 730 may be a single server configure perform some or all (or most) of the operations described herein. Moreover, at reporting time, metrics server 725 may collect event data obtained from one or more users 705-715 and execute a method such as the one depicted in FIG. 2 to make one or more user churn metric calculations. In addition, metrics server 725 may also provide reporting functions such as the ones discussed in the examples above. In some embodiments, metrics server 725 may generate a user churn report and transmit it to content provider 730 and/or to one or more users 705-715. Additionally or alternatively, metrics server 725 may provide a web-based interface accessible by a content developer. Moreover, metrics server 725 may also maintain a database of event data that is accessible by the content developer through stand-alone or dedicated client software.

Figure 8:
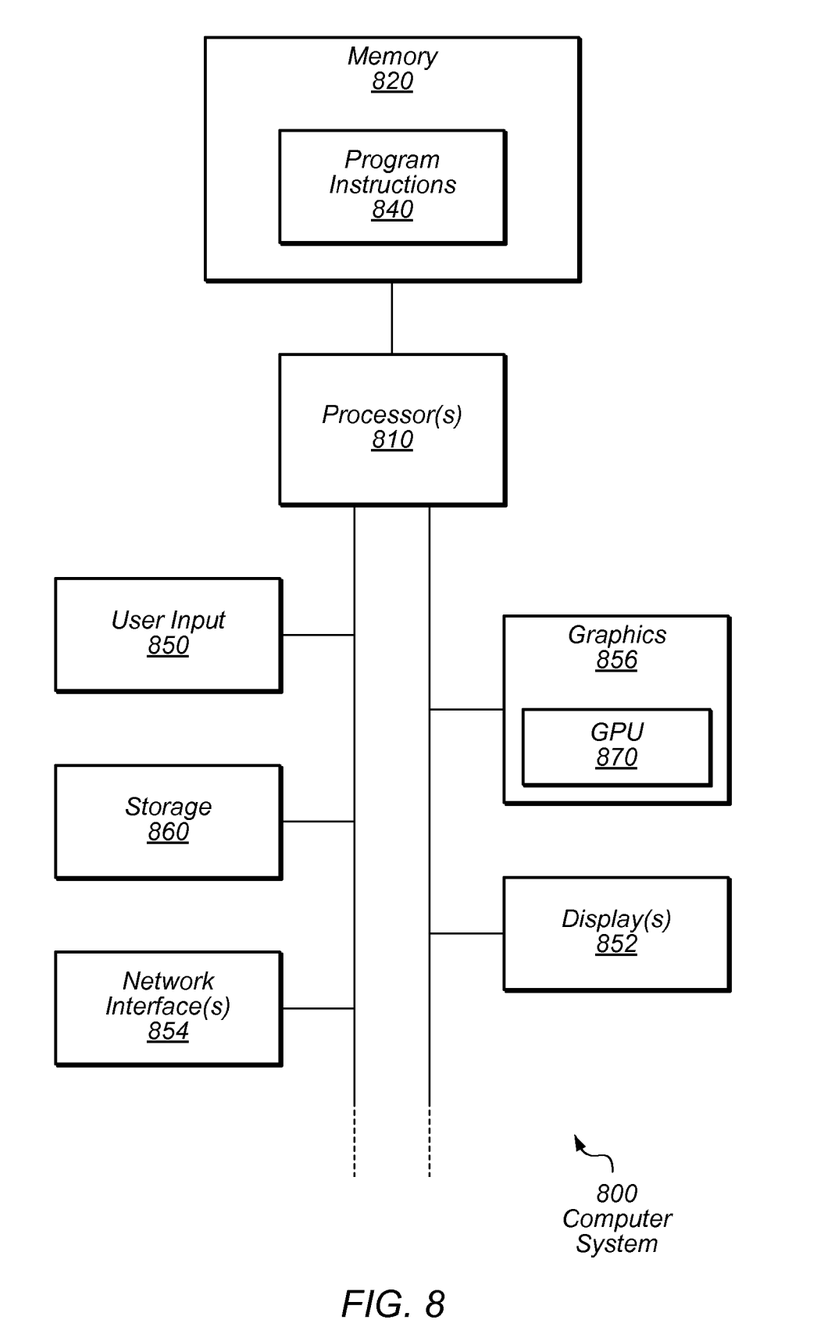
FIG. 8 is a block diagram of a computer system that may be used to implement some embodiments.

Referring now to FIG. 8, a block diagram is depicted showing elements of an illustrative computer system 800 configured to implement embodiments of systems and methods described herein. For example, computer system 800 may be used as user devices 705-715 and/or servers 725 and 730 of FIG. 6, and may be configured to execute algorithms such as those described in connection with FIGS. 1 and/or 2. The computer system 800 may include one or more processors 810 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 800, such as various versions of Unix, Linux, Windows® from Microsoft Corporation, MacOS® from Apple Inc., or any other operating system that enables the operation of software on a hardware platform. The processor(s) 810 may be coupled to one or more of the other illustrated components, such as a memory 820, by at least one communications bus.

In one embodiment, a specialized graphics card or other graphics component 856 may be coupled to the processor(s) 810. The graphics component 856 may include a graphics processing unit (GPU) 870, which in some embodiments may be used to perform at least a portion of the techniques described below. Additionally, the computer system 800 may include one or more imaging or display devices 852. The one or more imaging or display devices 852 may include various types of raster-based imaging devices such as monitors and printers. In one embodiment, one or more display devices 852 may be coupled to the graphics component 856 for display of data provided by the graphics component 856.

In one embodiment, program instructions 840 that may be executable by the processor(s) 810 to implement aspects of the techniques described herein may be partly or fully resident within the memory 820 at the computer system 800 at any point in time. The memory 820 may be implemented using any appropriate medium such as any of various types of ROM or RAM (e.g., DRAM, SDRAM, RDRAM, SRAM, etc.), or combinations thereof. The program instructions may also be stored on a tangible storage device 860 accessible from the processor(s) 810. Any of a variety of storage devices 860 may be used to store the program instructions 840 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 860 may be coupled to the processor(s) 810 through one or more storage or I/O interfaces. In some embodiments, the program instructions 840 may be provided to the computer system 800 via any suitable computer-readable storage medium including the memory 820 and storage devices 860 described above.

The computer system 800 may also include one or more additional I/O interfaces, such as interfaces for one or more user input devices 850. In addition, the computer system 800 may include one or more network interfaces 854 providing access to a network such as, for example the Internet or the like. It should be noted that one or more components of the computer system 800 may be located remotely and accessed via the network. The program instructions may be implemented in various embodiments using any desired programming language, scripting language, or combination of programming languages and/or scripting languages (e.g., C, C++, C#, Java™, Perl, etc.) The computer system 800 may also include numerous additional elements not shown in FIG. 8 for sake of simplicity, as illustrated by the ellipsis.

Systems and methods for user churn reporting based on engagement metrics described herein may enable content developers, product managers, marketing professionals, business executives, and consultants to measure the number of acquired users or customers that are abandoning a product or service, as well as the success of efforts to re-engage lost users. Specifically, user churn reporting as disclosed herein provides visibility into increases and decreases in the user population and the average length of participation. By assessing user churn, one may tune user acquisition and user experience to reduce the amount of lost users. In some embodiments, systems and methods for user churn reporting allow differentiation between newly acquired customers and previously acquired customers when assessing current user base. As such, these systems and methods may be especially useful in assessing how modifications to the user experiences are positively or negatively impacting the rate at which acquired users abandon the product or service. Insight into abandonment and lifespan of users may be useful for improving messaging and service content to better retain acquired users, etc.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

We claim:

1. A non-transitory computer-readable storage medium having instructions stored thereon that, upon execution by a computer system, cause the computer system to perform operations comprising:
receiving first event data indicative of activity of a plurality of users with respect to electronic content during a first time period;
for each user of the plurality of users, determining, based on the first event data, whether the user is engaged based on activity for the user satisfying a threshold level of engagement;
determining, based on said determining for each user of the plurality of users, a number of users engaged with the electronic content during the first time period;
receiving second event data indicative of activity of a subset of the plurality of users with respect to electronic content during a second time period subsequent to the first time period;
determining, for the second time period, a number of acquired users since the first time period;
for each user of the subset of the plurality of users, determining, based on the second event data, whether the user is engaged based on activity for the user satisfying the threshold level of engagement;
determining, based on said determining for each user of the subset of the plurality of users, a number of users engaged with electronic content during the second time period;
calculating, based, at least in part, upon the number of users engaged with electronic content during the first time period and based upon the number of users engaged with electronic content during the second time period and based upon the number of acquired users since the first time period, a user churn metric corresponding to a portion of the plurality of users engaged with the electronic content during the first time period that have ceased engagement with the electronic content during the second time period in the absence of an event indicating discontinuation of the portion's engagement with the electronic content;
calculating, upon the number of users engaged with electronic content during the first time period and based upon the number of users engaged with electronic content during the second time period and based upon the number of acquired users, a lifetime user churn metric corresponding to users of the plurality of users spanning the lifetime of a product or service; and
generating an electronic report comprising the user churn metric that identifies re-engagement of previously churned users and comprising the lifetime user churn metric.

2. The non-transitory computer-readable storage medium of claim 1, wherein the plurality of users does not subscribe to the electronic content.

3. The non-transitory computer-readable storage medium of claim 1, wherein the threshold level of engagement is one of a plurality of thresholds of levels of engagement, and wherein each different threshold of the plurality of thresholds corresponds to a different class of user.

4. The non-transitory computer-readable storage medium of claim 1, wherein the electronic content comprises a software application, and wherein the first and second event data is obtained during execution of the software application.

5. A method, comprising:
performing, by one or more computing devices,
receiving, over a computer network, event data indicative of a plurality of distinct users that performed an action with respect to electronic content during a time period;
classifying each of the plurality of distinct users as an engaged user for the time period to determine a number of engaged users for the time period;
determining a number of acquired users for the time period;
identifying a number of total users;
calculating a user churn metric with respect to the electronic content for the time period based, at least in part, on the number of total users, the number of acquired users, and the number of engaged users, wherein the user churn metric is indicative of a subset of the total users that has ceased engagement with the electronic content during the time period without triggering an event indicating discontinuation of engagement with the electronic content;
calculating, upon the number of users engaged with electronic content during a first time period and based upon the number of users engaged with electronic content during a second time period and based upon the number of acquired users, a lifetime user churn metric corresponding to users of the plurality of users spanning the lifetime of a product or service; and
generating a first electronic report comprising the user churn metric that identifies re-engagement of previously churned users and comprising the lifetime user churn metric.

6. The method of claim 5, wherein the electronic content comprises a non-subscription-based electronic content and the action comprises a presentation of the electronic content.

7. The method of claim 5, wherein the electronic content comprises a non-subscription-based application and the action comprises execution of the application on the user's device.

8. The method of claim 5, wherein the electronic content comprises a non-subscription-based application and the action comprises selection of a feature within the application during its execution on the user's device.

9. The method of claim 5, wherein calculating the user churn metric comprises calculating a percentage of churned users excluding the number of acquired users acquired during the time period.

10. The method of claim 5, wherein calculating the user churn metric comprises calculating a change in churned users between the time period and another time period.

11. The method of claim 5, wherein calculating the user churn metric comprises calculating the metric in a segment including one or more of device type or operating system.

12. The method of claim 5, further comprising:
performing, by the one or more computing devices,
generating a second electronic report of the user churn metric that identifies reengagement of previously churned users with respect to a release of a new version of the electronic content.

13. The method of claim 5, further comprising:
performing, by the one or more computing devices,
generating a second electronic report of the user churn metric that identifies reengagement of previously churned users with respect to a marketing event promoting the electronic content.

14. The method of claim 5, wherein classifying each of the plurality of users as an engaged user further comprises determining a level of engagement for one or more users based, at least in part, upon a type of user of the one or more users.

15. The method of claim 5, wherein classifying each of the plurality of users as an engaged user further comprises determining a level of engagement for one or more users based, at least in part, upon a geographical location of the one or more users.

16. A system, comprising:
one or more memories that, during operation, store instructions; and
one or more processors that, during operation, retrieve instructions from the one or more memories and execute the instructions to cause the system to perform operations comprising:
receiving first event data indicative of activity of a first subset of a plurality of users with respect to electronic content during a first time period;
for each user of the first subset of the plurality of users, determining, based on the first event data, whether the user is engaged based on activity for the user satisfying a threshold level of engagement;
determining, based on said determining for the first subset of the plurality of users, a first number of users engaged with the electronic content during the first time period;
receiving second event data indicative of a second subset of the plurality of users with respect to the electronic content during a second time period subsequent to the first time period;
determining, for the second time period, a number of acquired users since the first time period;
for each user of the second subset of the plurality of users, determining, based on the second event data, whether the user is engaged based on activity for the user satisfying the threshold level of engagement;
determining, based on said determining for the second subset of the plurality of users, a second number of users engaged with the electronic content during the second time period;
calculating a user churn metric for the second time period based, at least in part, on the first and second number of users engaged with the electronic content and based on the number of acquired users since the first time period, wherein the user churn metric identifies a portion of the first subset of the plurality of users that ceased to be engaged during the second time period;
calculating, upon the first and second number of users engaged with the electronic content and based on the number of acquired users since the first time period, a lifetime user churn metric corresponding to users of the plurality of users spanning the lifetime of a product or service; and
generating an electronic report comprising the user churn metric that identifies re-engagement of previously churned users and comprising the lifetime user churn metric.

17. The system of claim 16, wherein said determining the first and second number of users are engaged is based on threshold engagement actions that change from the first time period to the second time period.

18. The system of claim 16, wherein the electronic content comprises a product or service.

19. The system of claim 18, wherein calculating the user churn metric comprises combining event data originated by an online store and by a brick-and-mortar store for same users.

* * * * *